D. DONCHEFF.
TIME CONTROLLED CAMERA ATTACHMENT.
APPLICATION FILED OCT. 24, 1918.
1,300,825.
Patented Apr. 15, 1919.
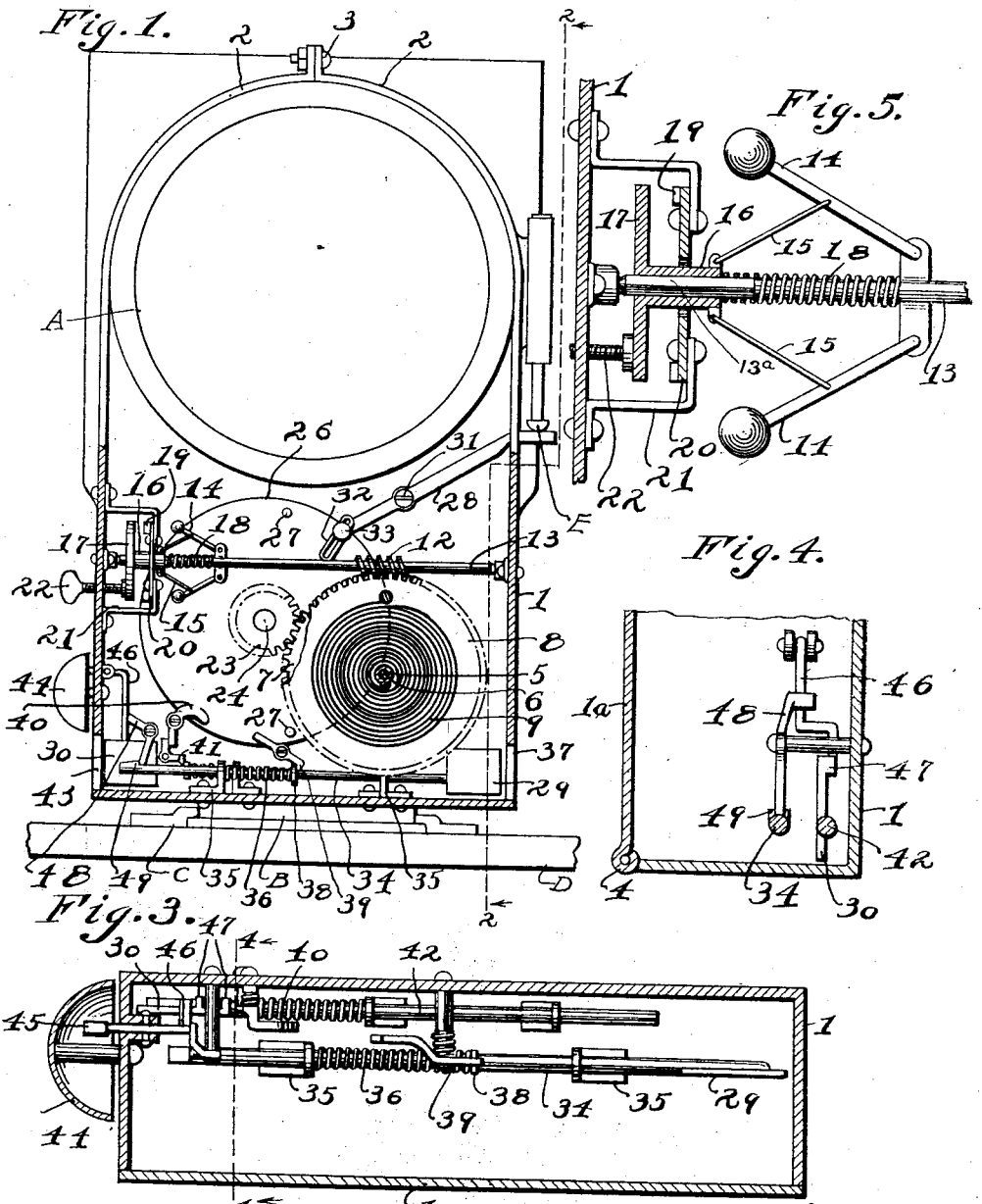
Inventor
D. DONCHEFF.
By  N. S. Hill
Attorney

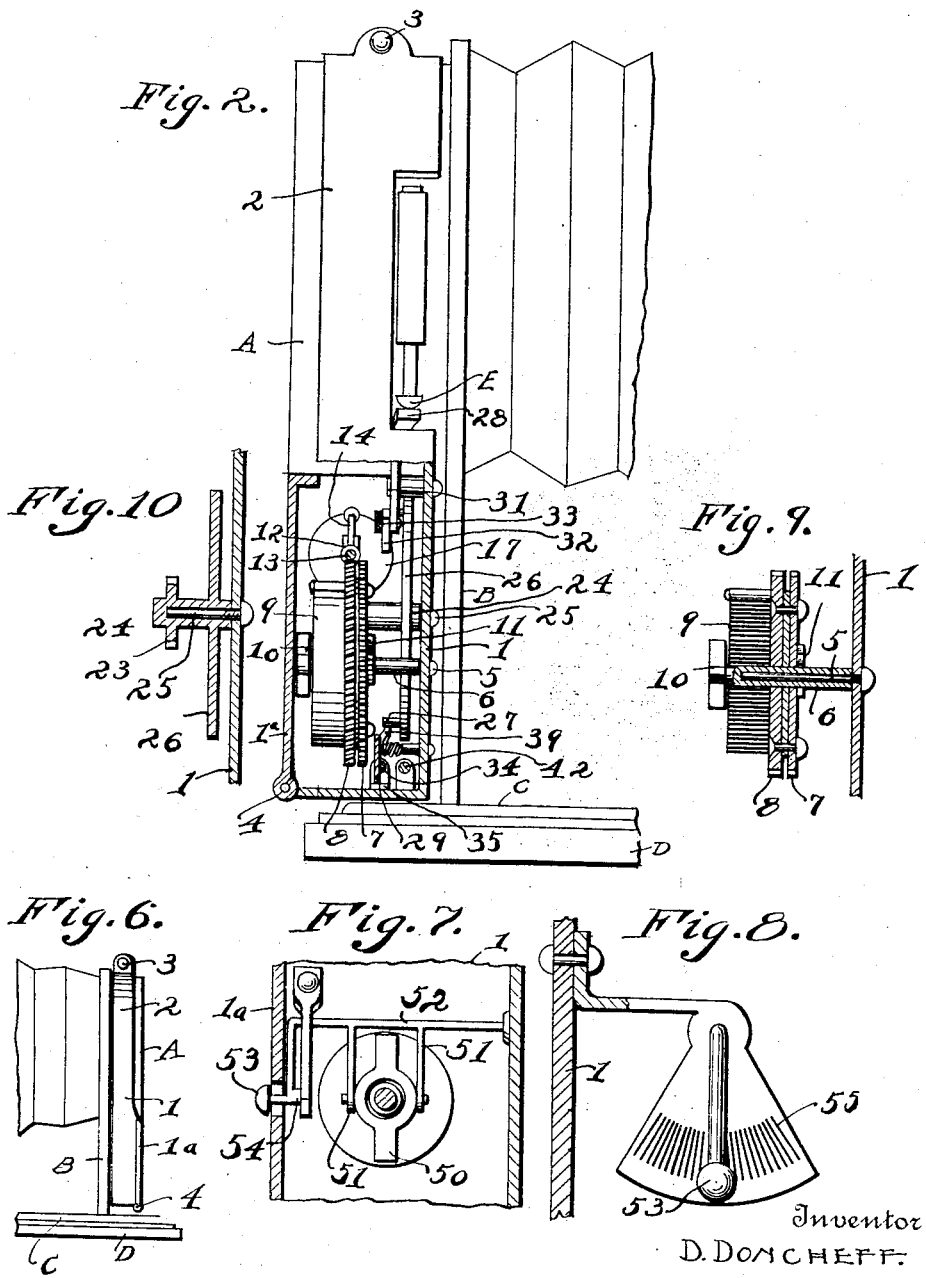

UNITED STATES PATENT OFFICE.

DEMETRE DONCHEFF, OF EAST ST. LOUIS, ILLINOIS.

TIME-CONTROLLED CAMERA ATTACHMENT.

1,300,825.  Specification of Letters Patent.  Patented Apr. 15, 1919.

Application filed October 24, 1918.  Serial No. 259,518.

*To all whom it may concern:*

Be it known that I, DEMETRE DONCHEFF, a citizen of the United States, residing at East St. Louis, in the county of St. Clair, State of Illinois, have invented a new and useful Time-Controlled Camera Attachment; and I do hereby declare the following to be a full, clear, and exact description of the invention, such as will enable others skilled in the art to which it appertains to make and use the same.

The present invention relates to a time controlled mechanism for automatically operating the shutter of a camera, and has for its object to provide a device of this character which embodies novel features of construction whereby the shutter will be actuated at a predetermined interval of time after the mechanism is set in operation, thereby enabling the photographer to himself pose as a part of the view if he so desires.

Further objects of the invention are to provide a device of this character which can be applied as an attachment to the conventional cameras now in use, which is dependable in its operation, and which includes means for signaling before and after the exposure is made so that there will be no uncertainty or difficulty in knowing how long to maintain the pose.

With these and other objects in view, the invention consists in certain novel combinations and arrangements of the parts as will more fully appear as the description proceeds, the novel features thereof being pointed out in the appended claims.

For a full understanding of the invention, reference is to be had to the following description and accompanying drawings, in which:—

Figure 1 is a front elevation of the lens and shutter portion of a conventional camera with the shutter operating mechanism applied thereto, portions being broken away and shown in section.

Fig. 2 is a side elevation of the same with portions thereof in section, the portion which is in section being on the line 2—2 of Fig. 1.

Fig. 3 is an enlarged horizontal sectional view through the lower portion of the attachment showing the signal means and trips for controlling the same, the other mechanism being removed.

Fig. 4 is a transverse sectional view on the line 4—4 of Fig. 3.

Fig. 5 is an enlarged detail view of the governor mechanism, portions being shown in section.

Fig. 6 is a side elevation on a reduced scale of the front end of a camera which has the attachment applied thereto.

Figs. 7 and 8 are detail views of a modified governor construction in which provision is made for setting the governor mechanism so that the motor will operate at a slow or a fast speed, as may be desired.

Figs. 9 and 10 are detail views of the stub shafts projecting from the back of the casing, showing the wheel members mounted thereon.

Corresponding and like parts are referred to in the following description and indicated in all the views of the drawings by the same reference characters.

Referring to the drawings, which illustrate one embodiment of the invention, the reference character A designates the front of a conventional camera which is supported by a standard B projecting from a slide C, said slide being movable in and out in the usual manner upon a base D for the purpose of properly focusing the camera. The shutter mechanism may be of any conventional construction and is controlled by the usual plunger E which is moved upwardly to operate the shutter. The time control mechanism for operating the shutter is arranged within a casing 1 which is adapted to be mounted under the front A of the camera, being shown as provided at the sides thereof with straps 2 which extend upwardly around the sides and top of the front and are connected at their upper ends by a fastening member 3. The front 1ª of the casing may be hinged at the lower end thereof, as indicated at 4, so that it can be swung outwardly to expose the mechanism and admit of access being obtained thereto. A stub shaft 5 projects from the back of the casing and has a sleeve 6 loose thereon, said sleeve being provided with a gear wheel 7 and a worm wheel 8 which are in turn loosely mounted on the sleeve. A spiral spring 9 has one end thereof connected to the worm wheel 8 and the other end connected to the sleeve 6. A finger piece 10 is rigid with the sleeve 6 and provides a means for rotating the same to place the spiral spring under tension, and there is a pawl and ratchet connection 11 between the wheels and the sleeve to prevent backward rotation of the wheels independently of the sleeve.

The worm wheel 8 meshes with a worm 12 on a horizontal shaft 13 which extends transversely across the casing 1 and which is provided with a governor mechanism for regulating the speed of the device. This governor includes a pair of weighted arms 14 which are connected by links 15 to a sleeve 16 which is slidable on a polygonal portion 13ª of the shaft 13. A disk 17 is rigid with the sleeve 16 and when the motor has acquired the predetermined speed, the outward movement of the governor arms 14 against the action of the spring 18 which resists the sliding movement of the sleeve 16 brings the disk 17 into engagement with brake shoes 19. These brake shoes are shown as supported by a plate 20 which is perforated to provide a clearance space for the shaft and sleeve 16, and which is held rigidly in position by the brackets 21. With this governor mechanism it will be obvious that after the motor has been started it will operate at a uniform speed and be prevented from raising or turning too rapidly. A manually operated brake 22 is shown as provided for engagement with the outer face of the disk 17, and this brake may provide a means for starting and stopping the motor. The member 22 has a threaded engagement with one end of the casing and can be screwed inwardly a sufficient amount to engage the disk 17 and lock the device against movement. If necessary, the disk can be clamped between the inner end of the screw 22 and one of the brake shoes 19.

The gear wheel 7 which is rigid with the worm wheel 8 meshes with a pinion 23 upon a sleeve 24 which is loose on a second stub shaft 25, said sleeve carrying the operating wheel 26 which is thus geared to the drive wheel in such a manner that it will be rotated at a predetermined speed when the motor is released. A pair of trip fingers 27 project from the operating wheel 26, the upper trip finger being arranged to operate a shutter releasing lever 28, while the lower trip finger successively releases the signal plates 29 and 30. The lever 28 is pivoted between its ends on a pivot stud 31, and one end thereof extends under the plunger E of the shutter mechanism, while the other end thereof is provided with an adjustable arm 32 which projects into the path of the upper trip finger 27. This arm 32 is slotted and held in an adjusted position by a set screw 33, thereby enabling it to be moved in and out and set in different angular positions. In this manner the time of the exposure can be regulated and controlled, since the trip finger 27 will obviously remain in engagement with the arm 32 a longer period of time when the arm is moved outwardly upon the lever than when the arm is moved inwardly thereon. If the shutter mechanism of the camera is set at what is ordinarily termed "bulb," the shutter will remain open as long as the plunger E is held in a raised position, and this will depend upon the length of time the trip finger remains in engagement with the arm 32.

The signal plate 29 is carried by a horizontal plunger 34 which is slidable within the guides 35 and is normally retracted within the casing, although it is adapted to be projected by a spring 36 through an opening 37 into a visible position. The spring bears against a collar 38, and a spring pressed detent 39 normally engages the collar to hold the signal plate in a retracted and inoperative position. However, before the upper trip finger 27 operates the shutter releasing lever 28, the lower trip finger 27 engages the detent 39 and releases the plunger 34, whereupon the signal plate 29 is projected through the opening 37 of the casing into a visible position. After the shutter releasing lever 28 has been actuated to make the exposure, the lower trip finger 27 engages a cam element 40 which releases a detent 41 provided for the plunger 42 of the second signal plate 30. This second signal plate 30 is carried by a spring actuated plunger, exactly as the first mentioned signal plate 29, although when released it is projected through an opening 43 in the opposite side of the casing. The signal plate 29 is thus released and moved into a visible position just in advance of the operation of the camera shutter, while the other signal plate 30 is released and moved into a visible position, after the exposure has been made.

A signal bell 44 is also provided and will be useful where the person must assume such a pose that it is impossible for him to see the camera and visible signal members. The pivoted hammer 45 of the bell is provided with a depending tail piece 46 which projects downwardly into the path of a pair of detents 47 on the second signal member. A lever 48 which is mounted to actuate the tail piece 46 of the hammer is also arranged for engagement with a shoulder or detent 49 on the plunger 34 of the first signal member. It will thus be obvious that when the first signal plate 29 is projected into operative position, the lever 48 will cause the hammer 45 to sound the bell once, while when the second signal plate 30 is projected into operative position, after the completion of the exposure, the two detents 47 thereon will successively engage the tail piece 46 and cause the bell to be sounded twice. Both visible and audible signal means are thus provided for signaling just before the exposure is made and after the exposure is completed. The device can be set for a second exposure by winding the spring and permitting the wheel 26 to rotate until it is in proper position, at which time the parts can be locked against further movement and the two signal members forced inwardly into a retracted position. After the camera shutter has been operated, it will be necessary for the operator to manipulate the brake member 22 and stop the device before a second exposure is made. There will be just as much time provided for the operator to reach the camera and stop the device, as is originally provided for the operator to start the device and assume his position in front of the camera.

Figs. 7 and 8 illustrate a slightly modified construction of governor mechanism in which provision is made for adjusting the position of the brake shoes and thereby regulating the speed of the motor within certain limits. In this modified construction the brake shoes are carried by a plate 50 which is mounted between crank arms 51 projecting from a transverse shaft 52. A finger piece 53 at one end of the shaft provides a means for rotating the same to move the plate 50 and adjust the position thereof relative to the brake disk 17 of the governor mechanism. It will be obvious that when the plate 50 and brake shoes are moved away from the disk, the motor will acquire a greater speed before the disk contacts with the brake shoes, and that for slowing down the motor it is merely necessary to move the plate in the opposite direction. The finger piece 53 is shown as provided with a tongue 54 which is held in a spring engagement with a graduated plate 55, thereby enabling the governor to be adjusted for the desired speed and holding the parts in an adjusted position. This will also facilitate the adjustment of the mechanism for a longer or shorter exposure, the exposure being automatically made in either instance after the mechanism has been set in motion by releasing the manually controlled brake 22.

Having thus described the invention, what I claim as new and desire to secure by Letters Patent, is:—

1. The combination with a camera and its shutter mechanism, of a shutter releasing lever having an operative connection with the shutter mechanism of the camera, a movable trip member, and a contact arm adjustably mounted upon the lever and projecting into the path of the trip member.

2. The combination with a camera and its shutter mechanism, of a spring motor, trip means actuated by the spring motor for operating the shutter mechanism, signal plates, spring actuated plungers carrying the signal plates, detents normally holding the plungers in retracted position, and trip means controlled by the motor for releasing the respective plungers before and after the operation of the shutter.

3. The combination with a camera and its shutter mechanism, of a spring motor, trip means actuated by the spring motor for operating the shutter mechanism, signal plates, spring actuated plungers carrying the signal plates, detents normally holding the plungers in a retracted position, trip means controlled by the motor for releasing the detents before and after the operation of the shutter, respectively, and an audible signal sounded simultaneously with the movement of each of the signal plates into operative position.

4. The combination with a camera and its shutter mechanism, of a spring motor, trip means actuated by the spring motor for operating the shutter mechanism, a signal plate, a spring actuated plunger carrying the signal plate, a detent holding the plunger normally in retracted position, and trip means actuated by the motor for releasing the detent in timed relation to the operation of the camera shutter.

5. The combination with a camera and its shutter mechanism, of a spring actuated wheel, governor means for the wheel, a trip wheel geared to the spring actuated wheel, a trip finger projecting from the trip wheel, a shutter releasing lever operatively connected to the shutter mechanism of the camera, and an adjustable contact arm mounted upon the said lever and projecting into the path of the finger.

6. The combination with a camera and its shutter mechanism, of a spring actuated wheel, governor means for the wheel, a trip wheel geared to the spring actuated wheel, a pair of trip fingers projecting from the trip wheel, a shutter releasing lever actuated by one of the trip fingers, a pair of spring actuated signals, detents normally holding the signals in inoperative position and arranged to be successively released by the other trip finger before and after the operation of the shutter releasing lever, respectively.

7. The combination with a camera and a shutter mechanism, of a trip wheel, means for driving the trip wheel, a finger projecting from the trip wheel, a shutter releasing lever having an operative connection with the shutter mechanism of the camera, and a contact arm adjustably mounted on the lever and projecting into the path of the finger.

In testimony whereof I have signed my name to this specification in the presence of two subscribing witnesses.

DEMETRE DONCHEFF.

Witnesses:
CHARLES A. KARSH,
J. B. SUMMERS.

Copies of this patent may be obtained for five cents each, by addressing the "Commissioner of Patents, Washington, D. C."